United States Patent [19]

Windisch

[11] 4,099,159

[45] Jul. 4, 1978

[54] LIGHT SIGNALLING DEVICE FOR BICYCLES

[76] Inventor: Anthony J. Windisch, 3882 Walsh, St. Louis, Mo. 63116

[21] Appl. No.: 777,634

[22] Filed: Mar. 15, 1977

Related U.S. Application Data

[63] Continuation-in-part of Ser. No. 661,952, Feb. 27, 1976, Pat. No. 4,020,458.

[51] Int. Cl.² .................. B60Q 1/00; H01H 3/16
[52] U.S. Cl. .................. 340/134; 200/61.27; 339/176 M; 340/66; 362/184
[58] Field of Search .......... 340/134, 97, 73, 72, 340/67, 66; 200/61.27; 240/7.55

[56] References Cited

U.S. PATENT DOCUMENTS

| | | | |
|---|---|---|---|
| 2,139,420 | 12/1938 | Richards | 340/97 |
| 2,201,795 | 5/1940 | Schnurpfeil | 340/72 |
| 4,020,458 | 4/1977 | Windisch | 340/67 |

Primary Examiner—Donald J. Yusko
Attorney, Agent, or Firm—James R. Bell

[57] ABSTRACT

A light signalling device is provided for use with bicycles and includes a housing and a cover mounted on the housing. The cover includes a plurality of light penetrable portions. Light emitting lamps are mounted in the housing for separately illuminating each light penetrable portion. A multi-positionable switch is connected for controlling illumination of the light penetrable portions in various arrays. The cover further includes at least two light penetrable materials. One of the materials being relatively more light penetrable than the other. A lamp retaining member is provided in the housing for electrically interconnecting the ground portion of each lamp with the ground portion of a power source also provided in the housing.

6 Claims, 8 Drawing Figures

LIGHT SIGNALLING DEVICE FOR BICYCLES

CROSS - REFERENCE TO RELATED APPLICATIONS

This is a continuation-in-part of my copending application Ser. No. 661,952 filed Feb. 27, 1976; now U.S. Pat. No. 4020458,

BACKGROUND OF THE INVENTION

1. Field Of The Invention

This invention relates generally to signals and indicators and more particularly to those used in connection with vehicles to indicate motion and direction.

2. Discussion Of The Prior Art

Generally, lighting devices are available for bicycles in various forms. Such devices, usually battery powered, may provide turn signal indicators or may provide running lights. Rarely, if ever, do such devices provide stop lights. The turn signal indicators and the running lights are usually part of separate units provided for installation on a bicycle. Left and right signal indicators are mounted to the left and right of center, respectively, of the bicycle when viewed from the rear. Since a bicycle has a rather narrow silhouette when viewed from the rear, it may be difficult to distinguish, from a distance, whether a single turn signal indicator is located either to the left or right of the center of the silhouette even when the indicators are spaced apart. It would be of benefit therefore to have a lighting device for bicycles having preferably on a single console, a running light, stop lights and turn signal indicators which are referenced in some manner to indicate their position relative to either the left or right of center.

SUMMARY OF THE INVENTION

Accordingly, the present invention provides a light device for bicycles having a battery powered console or housing including a running light, stop lights and turn signal indicators. The running light is mounted in the center of the console. Each of the stop lights are mounted to the left and right of the running light, respectively, and are separated thereby. The stop lights also function as the turn signal indicators. A multi-positionable switch is connected for controlling display of the lights in different arrays. The switch is positionable to simultaneously interrupt illumination of each light; to illuminate only the center portion; to simultaneously illuminate all portions; to simultaenously illuminate the center portion and the portion to the right; and to simultaneously illuminate the center portion and the portion to the left. A cover on the housing includes at least two light penetrable materials of different color, one of the materials being relatively more light penetrable than the other for the purpose of producing light contrast and enhancing visibility of the light signalling device. A lamp retaining member is provided in the housing for electrically interconnecting the threaded ground portion of each lamp with the ground side of a power source such as batteries provided in the housing.

Other advantages and novel features of the invention will become apparent from the following detailed description of the invention when considered in conjunction with the accompanying drawings. It is to be expressly understood, however, that the drawings are not intended as a definition of the invention but are for the purposes of illustration only.

BRIEF DESCRIPTION OF THE DRAWINGS

In the drawings wherein like parts are marked alike.

DESCRIPTION OF THE PREFERRED EMBODIMENT

Figure 1:
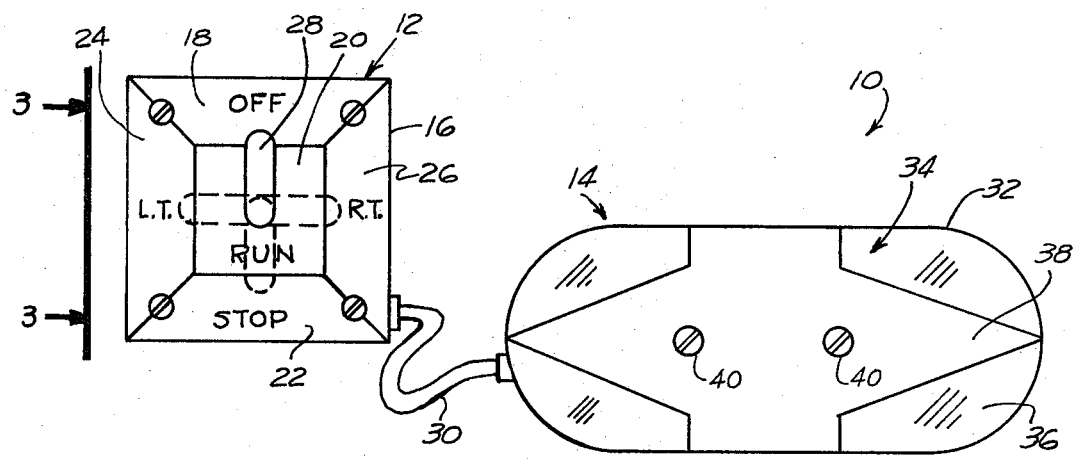
FIG. 1 is a plan view illustrating the lighting system of this invention including a switch and an associated lighting housing.

Referring now to the drawings, FIG. 1 illustrates generally a light signalling device 10 suitable for mounting on bicycles and including a multi-positionable toggle switch 12 operably connected for controlling a lighting display console 14. Switch 12 includes a face or support portion 16 having a display of five positions including "off" position 18, "run" position 20, "stop" position 22, "left turn" position 24 and "right turn" position 26. Each position is selectable by pivoting lever 28 toward the position desired. Console 14 is operably connected to switch 12 by any suitable conductor 30 and includes housing 32 having cover 34 mounted thereon. Cover 34 includes a light penetrable or translucent base portion 36 and another light penetrable or translucent relatively raised portion 38 on the base. Light emitting lamps, to be discussed later in greater detail, are mounted in the housing directly behind the raised portion 38 for illuminating the cover. Cover 38 may be mounted on housing 32 by screws 40 or the like.

Figure 3:
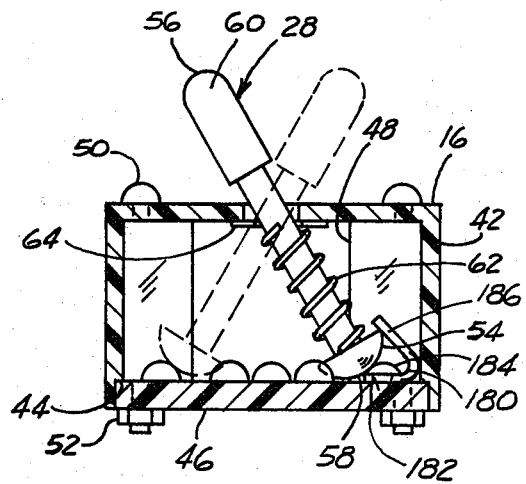
FIG. 3 is a cross-sectional side elevation of the switch taken along the line 3—3 of FIG. 1.

Switch 12 is multi-positionable for controlling illumination of the light penetrable portions in various arrays. The switch includes first support member 16 preferably formed of a plastic or other suitable synthetic material, FIG. 3. Also, sidewalls 42 may be integratedly formed with first support 16 if preferred. Sidewalls 42 are notched at 44 to seat on second support member 46, also of a synthetic material.

Guides 48 may be provided between first and second supports 16, 46 to assist in guiding contact member 54 to a preselected position. Bolts 50 and nuts 52 cooperate with sides 42 and guides 48 to interconnect and maintain first and second supports 16, 46 in relatively spaced relationship.

Switch lever 28 is pivotal at first support 16 and includes first end 56 and second end 58. Handle 60 is mounted on first end 56 and contact member 54 is mounted on second end 58. Lever 28 extends through first support 16 and terminates at second end 58 with contactor 54 in abutting relationship with second support 46. Resilient member or spring 62 is compressed between contactor 54 and first support 16. Washer 64 may be provided as a stop for spring 62 if desired.

Figure 2:
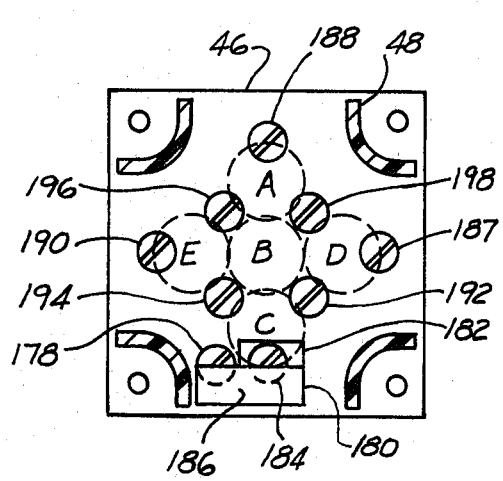
FIG. 2 is an isolated plan view of a support member of the switch.

A plurality of position selection retention means are provided on second support 46 by a plurality of round head screws in a preselected arrangement, best shown at FIG. 2. It can be seen by the dotted lines representing the various positions of contactor 54 designated as positions A through D. Due to compression of spring 62, contactor 54 is urged into these various positions. Others of such round head screws are electrically connected to a power source in the housing and as such provide a plurality of circuit connection means mounted on the second support 46 for electrical interconnection through contactor 54 and for circuit making and breaking engagement there between when switch lever 28 is pivoted at first support 16.

Figure 5:
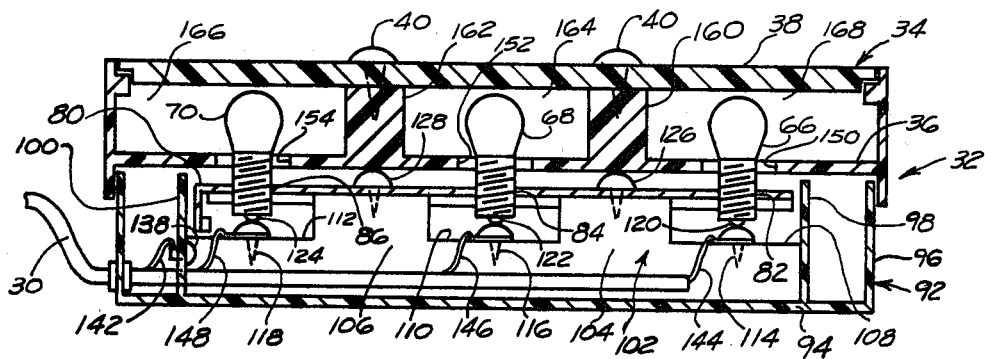
FIG. 5 is a cross-sectional side elevation of the lighting housing of this invention.

A plurality of light emitting lamps 66, 68, 70 are mounted in housing 32 for separately illuminating each light penetrable portion, see FIG. 5. A power source such as four size "C" dry cells designated 72, 74, 76, 78 of 1.5 volts each are connected in series in housing 32 to provide a power source of 6 volts d.c. Also, in housing 32 is a conductive ground bar 80 which also functions as a holder or base for lamps 66, 68, 70. Bar 80 electrically interconnects ground portions 82, 84, 86 of each lamp with the ground portion of the power source at 88 via tab 90.

Figure 6:
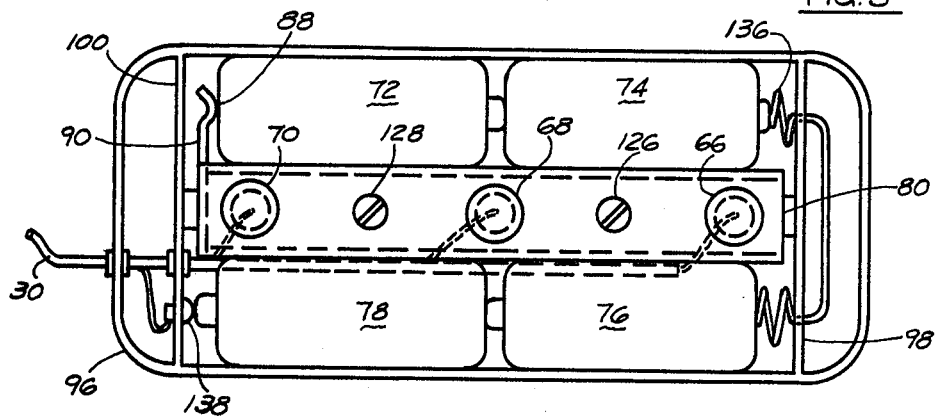
FIG. 6 is a top view of the lighting housing.

Housing 32, FIGS. 5 and 6, includes housing base 92 including bottom portion 94 and sides 96 preferably formed together as an integral part such as a molded plastic or other suitable synthetic material. End walls 98, 100 are also preferably molded with the bottom and sides. A molded mount 102, in base 92 includes raised portions 104, 106 separating recesses 108, 110, 112. At the bottom of each recess, round head screws 114, 116, 118 are threadedly secured. These screws are conductors for contacting the power sides 120, 122, 124 of the lamps 66, 68, 70, respectively.

Figure 7:
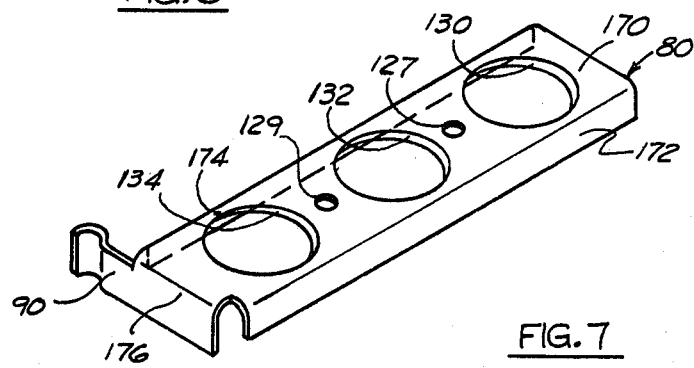
FIG. 7 is an isometric view of the novel grounding bar/lamp holder of this invention.

Conductive ground bar 80, FIG. 7, is secured to raised portions 104, 106 by screws 126, 128 in apertures 127, 129. Lamp sockets or apertures 130, 132, 134, engage ground portions 82, 84, 86 of lamps 66, 68, 70. The previously mentioned "C" cells 72, 74, 76, 78 are connected in series and mounted in housing base 92. Cells 72, 74, FIG. 6, are engaged in plus to minus relationship. The plus side of cell 74 is connected to the minus side of cell 76 via coiled conductor 136 mounted in end wall 98. The plus side of cell 76 is engaged with the minus side of cell 78. The plus or power side of cell 78 is engaged with screw 138 engaged with and passing through end wall 100. The ground or minus side of cell 72 engages tab 90 for simultaneous ground connection with each lamp 66, 68, 70.

A four lead cable 30 passes through side 96. First lead 142 connects with screw 138. Second lead 144 connects with lamp 66 whereas third and fourth leads 146, 148 connect with lamps 68, 70, respectively.

Figure 8:
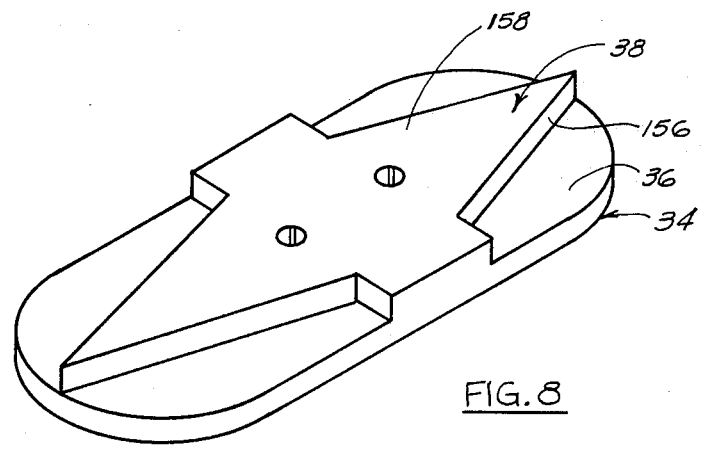
FIG. 8 is an isometric view of the novel cover for the lighting housing of this invention.

Cover 34, FIGS. 5 and 8, includes cover base 36 having apertures 150, 152, 154 formed therein for accommodating lamp 66, 68, 70. Base 36 is preferably of a molded synthetic or plastic and comprises a first white colored light penetrable material. Raised portion 38 includes sides 156 formed of the first material and face 158 formed of a second red colored material more light penetrable than the first material. Penetrability can be controlled by material thickness or other physical properties. Separators or partitions 160, 162 are provided vertically between cover base 36 and face portion 158 and are substantially non-light penetrable for forming a plurality of light penetrable portions in cover 34. Screws 40 in face 158 secure cover 34 to separators 160, 162. Center portion 164 is illuminated by lamp 68, left-of-center portion 166 is illuminated by lamp 70 and right-of-center portion 168 is illuminated by lamp 66.

Returning again to FIG. 7, holder or bar 80 comprises an elongated strip 170 of electrically conductive material. Lamp base receptacles or apertures 130, 132, 134 are formed in strip 170 for engaging and retaining threaded electrical ground portions 82, 84, 86 of each lamp base. Opposed sides 172, 174 are right angularly formed along and spaced by strip 170 adjacent the receptacles for reinforcing the strip and for adding depth to the lamp base. Resilient tab 90 is formed with strip 170 at an end 176 and provides simultaneous electrical interconnection between each lamp base in the receptacle bar 80 and an electrical ground portion of the power source as previously discussed.

Figure 4:
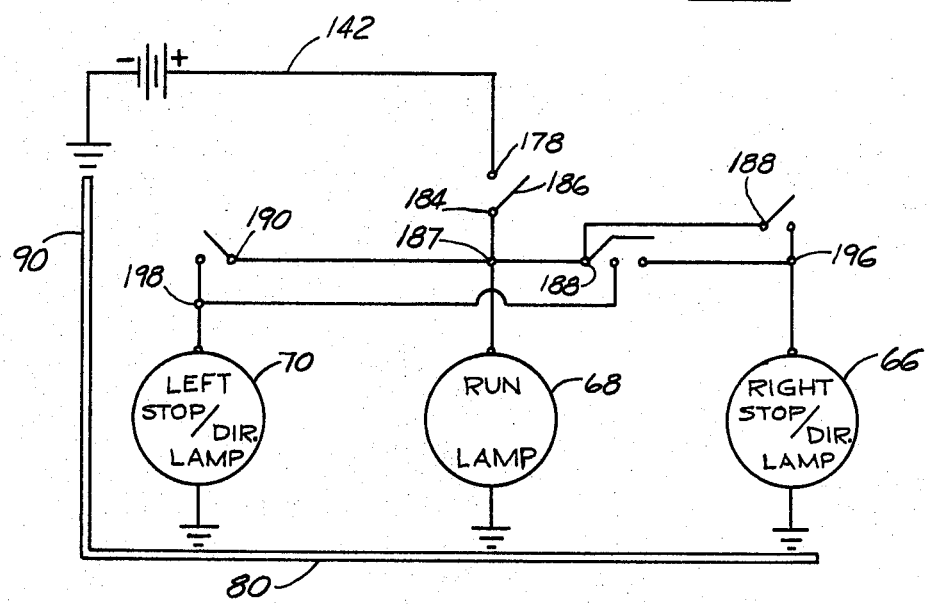
FIG. 4 is a schematic illustration of the wiring diagram and associated components of the lighting system of this invention.

In FIG. 2 round head screw 178 is connected to power lead 142. Leaf switch 180, preferably of brass, includes a tab 182 secured to second support member 46 by by screw 184. Resilient leaf portion 186 is biased to contact screw 178. Screw 184 is electrically connected to screw 187. Screw 187 is electrically connected to screw 188 and to run lamp 68. Screw 188 is electrically connected to screw 190. Screws 192, 194 are electrically dead whereas screw 198 is electrically connected to left turn lamp 70. Screw 196 is electrically connected to right turn lamp 66. These connections are further described at FIG. 4 which illustrates a circuit diagram correlated to the above description. Also in FIG. 4, a graphical representation is made of bar 80 simultaneously interconnecting the ground side of each lamp with the ground side of the d.c. power source via tab 90.

In operation, with the above described parts assembled as described, it can be seen that when lever 28 is pivoted to the "off" position C, contactor 54 moves leaf 186 out of contact with screw 178 thus interrupting power and simultaneously interrupting illumination of each light penetrable portion. When lever 28 is pivoted to the "run" position B leaf 186 contacts screw 178 and run lamp 68 illuminates only center portion 164. When lever 28 is pivoted to the "stop" position A, leaf 186 contacts screw 178 and contactor 54 interconnects screws 188, 196, 198, and lamps 66, 68 and 70 simultaneously illuminate portions 164, 166, 168. When lever 28 is pivoted to "right turn" position E, leaf 186 contacts screw 178 and contactor 54 contacts screws 190, 196 and lamps 66, 68 simultaneously illuminate portions 164, 168. When lever 28 is pivoted to the "left turn" position D, leaf 186 contacts screw 178 and contactor 54 contacts screws 187, 198 and lamps 68, 70 simultaneously illuminate portions 164, 166.

The foregoing has described a light signalling device for use with bicycles having a unique multi-colored cover and a grounding bar for grounding and holding the lamp bases.

Other modifications and variations of the present invention are possible in the light of the above teachings. It is to be understood that within the scope of the appended claims the invention may be practical otherwise than as specifically described.

What is claimed is:

1. A light signalling device for bicycles comprising, in combination:
   a. a housing
   b. a cover mounted on the housing;
   c. a plurality of light penetrable portion in the cover including a center portion separating an adjacent portion left of center and an adjacent portion right of center;

d. a plurality of light emitting lamp means mounted in the housing for separately illuminating each light penetrable portion;

e. a power source in the housing;

f. multi-positionable switch means connected for controlling illumination of the light penetrable portions in various arrays and positionable for:

1. simultaneously interrupting illumination of each portion;
2. illuminating only the center portion;
3. simultaneously illuminating all portions;
4. simultaneously illuminating the center portion and the portion to the right of the center portion; and
5. simultaneously illuminating the center portion and the portion to the left of the center portion; and g. means in the housing for retaining the lamp means in position and for electrically interconnecting the ground portion of each lamp with the ground portion of the power source.

2. The light signalling device of claim 1 wherein the cover comprises:

a. a base portion including a first colored light penetrable material; and b. a relatively raised portion on the base portion including sides formed of the first material and a face formed of a second colored material relatively more light penetrable than the first material.

3. The light signalling device of claim 1 wherein the switch comprises:

a. a first support member;
b. a second support member;
c. means for interconnecting and maintaining the first and second support members in relatively parallel spaced relationship;
d. a switch lever pivotal at the first support member including first and second ends, the lever extending through the first support member and terminating at the second end in abutting relationship with the second support member;
e. a handle portion on the first end of the switch lever;
f. a contact member mounted on the second end of the switch lever; and
g. a resilient member on the switch lever compressed between the contact member and the first support member.

4. The light signalling device of claim 3 wherein the switch further comprises:

a plurality of position selection retention means on the second support member for retaining the contact member in preselected positions when the switch lever is pivoted at the first support member.

5. The light signalling device of claim 3 wherein the switch further comprises:

position selection guide means between the first and second support member for guiding the contact member to a preselected one of the position selection retention means when the switch lever is pivoted at the first support member.

6. The light signalling device of claim 5 wherein the switch further comprises:

a plurality of circuit connection means mounted on the second support member for electrical interconnection through the contact member and for circuit making and breaking engagement therebetween when the switch lever is pivoted at the first support member.

* * * * *